_(12)_ United States Patent
Whitfield et al.

(10) Patent No.: US 10,306,317 B2
(45) Date of Patent: *May 28, 2019

(54) METHODS, SYSTEMS, AND DEVICES FOR SECURING CONTENT

(71) Applicant: AT&T Intellectual Property I, L.P., Atlanta, GA (US)

(72) Inventors: Lloyd T. Whitfield, Atlanta, GA (US); Randy S. Zimler, Gainesville, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 18 days.

This patent is subject to a terminal disclaimer.

(21) Appl. No.: 15/631,143

(22) Filed: Jun. 23, 2017

(65) Prior Publication Data

US 2017/0289627 A1 Oct. 5, 2017

Related U.S. Application Data

(63) Continuation of application No. 14/058,252, filed on Oct. 20, 2013, now Pat. No. 9,721,110, which is a
(Continued)

(51) Int. Cl.
*H04L 29/06* (2006.01)
*H04N 21/4627* (2011.01)
(Continued)

(52) U.S. Cl.
CPC ....... *H04N 21/4627* (2013.01); *G06F 3/0604* (2013.01); *G06F 3/067* (2013.01); *G06F 3/0659* (2013.01); *G06F 21/10* (2013.01); *G06F 21/62* (2013.01); *G06F 21/6209* (2013.01); *H04L 63/10* (2013.01); *H04N 7/165* (2013.01); *H04N 21/2541* (2013.01); *H04N 21/2543* (2013.01); *H04N 21/26241* (2013.01); *H04N 21/4331* (2013.01); *H04N 21/4508* (2013.01); *H04N 21/458* (2013.01); *H04N 21/4542* (2013.01); *H04N 21/8453* (2013.01); *H04N 9/8045* (2013.01)

(58) Field of Classification Search
CPC ........ G06F 21/10; G06F 21/12; G06F 21/121; G06F 21/31; H04N 21/2541; H04N 21/458; H04N 21/8453
See application file for complete search history.

(56) References Cited

U.S. PATENT DOCUMENTS 4,903,130 A 2/1990 Kitagawa et al.
5,255,180 A 10/1993 Shinoda et al.
(Continued)

FOREIGN PATENT DOCUMENTS

WO WO 0146782 6/2001

*Primary Examiner* — Eleni A Shiferaw
*Assistant Examiner* — Sher A Khan
(74) *Attorney, Agent, or Firm* — Scott P. Zimmerman, PLLC

(57) ABSTRACT

Methods, systems, and devices secure content in memory. The content includes a lock that prohibits reading the content from memory. Prior to expiration of the lock the content cannot be read from the memory. However, a preview option allows at least a portion of the content to be accessed. The preview option provides a preview of the content. At expiration, the content is readable.

20 Claims, 10 Drawing Sheets

Related U.S. Application Data continuation of application No. 13/530,172, filed on Jun. 22, 2012, now Pat. No. 8,590,053, which is a continuation of application No. 11/178,075, filed on Jul. 8, 2005, now Pat. No. 8,225,410.

(51) Int. Cl.

| | | |
|---|---|---|
| G06F 21/10 | (2013.01) | |
| G06F 21/62 | (2013.01) | |
| H04N 7/16 | (2011.01) | |
| H04N 21/262 | (2011.01) | |
| H04N 21/433 | (2011.01) | |
| H04N 21/45 | (2011.01) | |
| H04N 21/454 | (2011.01) | |
| G06F 3/06 | (2006.01) | |
| H04N 21/254 | (2011.01) | |
| H04N 21/2543 | (2011.01) | |
| H04N 21/458 | (2011.01) | |
| H04N 21/845 | (2011.01) | |
| H04N 9/804 | (2006.01) | |

(56) References Cited

U.S. PATENT DOCUMENTS

| | | | |
|---|---|---|---|
| 5,313,282 A | 5/1994 | Hayashi | |
| 5,331,354 A | 7/1994 | Koyama et al. | |
| 5,477,216 A | 12/1995 | Lee, Jr. | |
| 5,731,764 A | 3/1998 | Tanaka | |
| 5,857,020 A * | 1/1999 | Peterson, Jr. | G06F 21/10 |
| | | | 705/52 |
| 6,078,589 A | 6/2000 | Kuechler | |
| 6,237,022 B1 | 5/2001 | Bruck | |
| 6,324,182 B1 | 11/2001 | Burns | |
| 6,591,423 B1 | 7/2003 | Campbell | |
| 6,615,192 B1 | 9/2003 | Tagawa et al. | |
| 6,647,411 B2 | 11/2003 | Towell | |
| 6,757,796 B1 | 6/2004 | Hofmann | |
| 6,862,666 B2 | 3/2005 | Chong et al. | |
| 6,870,463 B2 | 3/2005 | Dresti et al. | |
| 6,885,738 B2 | 4/2005 | White et al. | |
| 6,961,849 B1 | 11/2005 | Davis | |
| 7,246,275 B2 | 7/2007 | Therrien et al. | |
| 7,444,682 B2 | 10/2008 | Li et al. | |
| 7,467,399 B2 | 12/2008 | Nadalin | |
| 7,953,665 B2 | 5/2011 | Deeds et al. | |
| 8,893,199 B2 * | 11/2014 | Grannan | H04N 7/17327 |
| | | | 725/101 |
| 2001/0034676 A1 | 10/2001 | Vasic | |
| 2002/0108127 A1 | 8/2002 | Lew | |
| 2002/0129371 A1 * | 9/2002 | Emura | G07F 17/0014 |
| | | | 725/61 |
| 2002/0133830 A1 | 9/2002 | Kim | |
| 2003/0055908 A1 | 3/2003 | Brown | |
| 2003/0058277 A1 | 3/2003 | Bowman-Amuah | |
| 2003/0067554 A1 | 4/2003 | Klarfeld | |
| 2003/0088878 A1 | 5/2003 | Rogers | |
| 2003/0120500 A1 | 6/2003 | Deeds | |
| 2003/0120680 A1 | 6/2003 | Agrawal et al. | |
| 2003/0135706 A1 | 7/2003 | Lin | |
| 2004/0078814 A1 | 4/2004 | Allen | |
| 2004/0162787 A1 | 8/2004 | Madison | |
| 2004/0255336 A1 | 12/2004 | Logan | |
| 2004/0268407 A1 | 12/2004 | Sparrell et al. | |
| 2004/0268410 A1 | 12/2004 | Barton | |
| 2005/0081252 A1 | 4/2005 | Chefalas | |
| 2005/0108481 A1 | 5/2005 | Iyengar et al. | |
| 2005/0177386 A1 | 8/2005 | Essa | |
| 2006/0028871 A1 | 2/2006 | Suzuki | |
| 2006/0080316 A1 | 4/2006 | Gilmore | |
| 2006/0080741 A1 | 4/2006 | Nair | |
| 2006/0136821 A1 | 6/2006 | Barabe et al. | |
| 2006/0173749 A1 * | 8/2006 | Ward | G06Q 10/08 |
| | | | 705/26.8 |
| 2006/0191016 A1 | 8/2006 | Ostergren | |
| 2006/0212943 A1 * | 9/2006 | Kitazato | G06F 21/10 |
| | | | 726/26 |
| 2007/0083556 A1 | 4/2007 | Plastina et al. | |
| 2007/0133953 A1 | 6/2007 | Fontijn et al. | |

* cited by examiner

METHODS, SYSTEMS, AND DEVICES FOR SECURING CONTENT

CROSS REFERENCE TO RELATED APPLICATIONS

This application is a continuation of U.S. application Ser. No. 14/058,252 filed Oct. 20, 2013 and since issued as U.S. Pat. No. 9,721,110, which is a continuation of U.S. application Ser. No. 13/530,172 filed Jun. 22, 2012 and since issued as U.S. Pat. No. 8,590,053, which is a continuation of U.S. application Ser. No. 11/178,075 filed Jul. 8, 2005 and since issued as U.S. Pat. No. 8,225,410, with all applications incorporated herein by reference in their entireties.

BACKGROUND

This application generally relates to pathfinding or routing in multiplex communications and to interactive video distribution systems and, more particularly, to storing and queuing arrangements and to video distribution systems with local interaction.

Bandwidth is becoming a problem in the communications industry. As subscribers demand more and more content, interactive services, on-demand services, and data services, the existing network infrastructure has trouble supplying adequate bandwidth. The industry is hard at work identifying new ways of increasing bandwidth. The industry is also striving to efficiently utilize current bandwidth capacity to provide the services that subscribers desire.

Prepositioning content is one example of efficient utilization. Prepositioning content involves sending or shifting content during lulls in demand. As those of ordinary skill in the art recognize, network bandwidth is constant, yet subscriber demand is not constant. Network bandwidth is taxed during times of peak demand (e.g., during business hours), yet nights and weekends have excess bandwidth. Because the off-peak hours have excess available bandwidth, content and service providers try to send, or preposition, content during these lulls in demand.

Security, however, is a concern with prepositioning. When content is sent during lulls in demand, the subscriber may receive the content hours, or even days, in advance. Network broadcast television shows, for example, may be sent during the off-peak hours to conserve bandwidth. Broadcasters, advertisers, and marketers, however, often do not want their media campaigns seen by customers/subscribers prior to scheduled network broadcast times. Even though broadcast programs and other content are prepositioned during off-peak hours, the content should be secured to prevent unauthorized or untimely access. What is needed, then, are methods, systems and products for securing content that prohibit access prior to a scheduled date and time.

SUMMARY

The aforementioned problems, and other problems, are reduced, according to exemplary embodiments, by methods, systems, and devices that secure content. These exemplary embodiments describe how movies, music, television programs, and, in general, content files may be secured to prohibit access until a scheduled date and time. When content is prepositioned to a subscriber's set-top box, television, computer, or other device, these exemplary embodiments secure that content to restrict or even prohibit reading the content from memory. The content is unreadable until expiration of a lock. The lock is an electronic or software mechanism that prevents an operating system from reading a file from memory until a scheduled date and/or time. The content file is unreadable prior to the scheduled date and time, but the content file may be accessed at or afterwards the scheduled date and time. The lock thus allows network broadcast programs to be downloaded and securely stored during off-peaks hours. At the scheduled date and time (such as the scheduled network broadcast for a sitcom episode), exemplary embodiments release the lock and allow the content file to be read from memory. So, even if the content is sent hours or even days in advance, exemplary embodiments prohibit access until expiration of the lock. Exemplary embodiments, however, may permit the subscriber to purchase an early viewing or listening option that allows the subscriber to experience the content prior to the scheduled date and time.

Exemplary embodiments secure content in memory. When content is received, the content includes a lock. The content is then stored in the memory. The lock, however, prohibits reading the content from the memory until expiration of the lock. The content is unreadable from the memory until the lock expires.

According to more exemplary embodiments, a device is also disclosed that secures content. The device comprises a processor communicating with memory. The processor receives content having a lock. The lock prohibits reading the content from the memory until expiration of the lock. The processor stores the content in the memory, thereby securing the content.

Exemplary embodiments also include a computer-readable medium. The computer-readable medium stores instructions for receiving and storing content. The content has a lock that prohibits reading the content from memory until expiration of the lock. Prior to expiration the content is unreadable, thereby securing the content in the memory.

Other systems, methods, and/or devices according to exemplary embodiments will be or become apparent to one with ordinary skill in the art upon review of the following drawings and detailed description. It is intended that all such additional systems, methods, and/or devices be included within this description, be within the scope of the exemplary embodiments, and be protected by the accompanying claims.

BRIEF DESCRIPTION OF THE DRAWINGS

These and other features, aspects, and advantages of the exemplary embodiments are better understood when the following Detailed Description is read with reference to the accompanying drawings, wherein.

DETAILED DESCRIPTION

Figure 1:
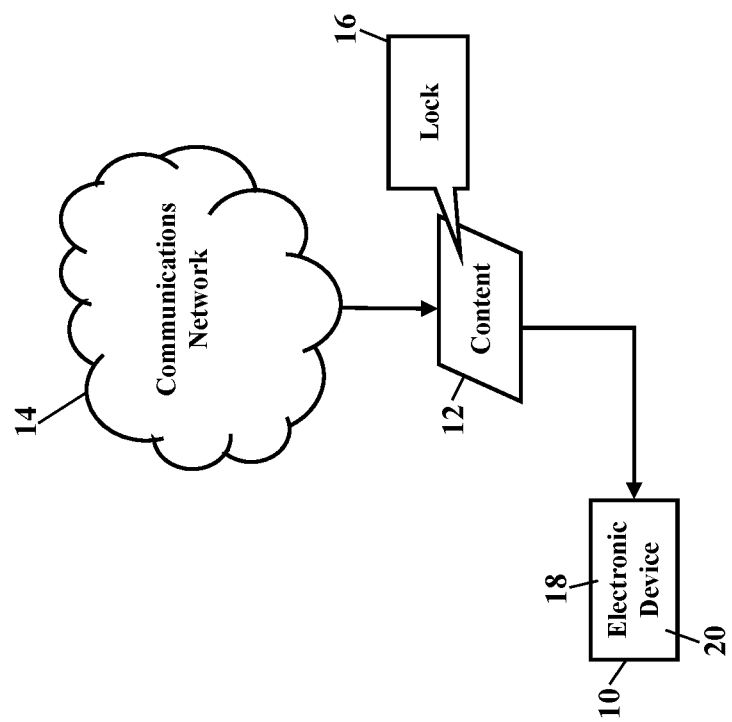
FIG. 1 is a simplified schematic illustrating an operating environment according to the exemplary embodiments.

The exemplary embodiments now will be described more fully hereinafter with reference to the accompanying drawings. The reader should recognize, however, that exemplary embodiments may have many different forms and should not be construed as limited to the embodiments set forth herein. These embodiments are provided so that this disclosure will be thorough and complete and will fully convey to those of ordinary skill in the art. Moreover, all statements herein reciting exemplary embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Functions may be carried out through the operation of program logic, through dedicated logic, through the interaction of program control and dedicated logic, or even manually, the particular technique being selectable by exemplary embodiments. Those of ordinary skill in the art further understand that the exemplary hardware, software, processes, methods, and/or operating systems described herein are for illustrative purposes and, thus, are not intended to be limited to any particular named manufacturer.

The exemplary embodiments describe methods, systems, and devices that secure content. These exemplary embodiments describe how movies, music, television programs, and content files in general may be secured to prohibit access until a scheduled date and time. When content is prepositioned to a subscriber's set-top box, television, computer, or other device, these exemplary embodiments secure that content to restrict or even prohibit reading the content from memory. The content is unreadable until expiration of a lock. The lock is an electronic or software mechanism that prevents an operating system from reading a file from memory until a scheduled date and/or time. The content file is unreadable prior to the scheduled date and time, but the content file may be accessed at or afterwards the scheduled date and time. The lock thus allows network broadcast programs to be downloaded and securely stored during off-peaks hours. At the scheduled date and time (such as the scheduled network broadcast for a sitcom episode), exemplary embodiments release the lock and allow the content file to be read from memory. So, even if the content is sent hours or even days in advance, exemplary embodiments prohibit the subscriber from accessing the content until expiration of the lock. Exemplary embodiments, however, may permit the subscriber to purchase an early viewing or listening option that allows the subscriber to experience the content prior to the scheduled date and time.

FIG. 1 is a simplified schematic illustrating exemplary embodiments. FIG. 1 shows a device 10 receiving content 12 via a communications network 14. Although the device 10 is generically shown, the device 10 can be any consumer electronics device, appliance, or processor-controlled system. The device 10, for example, may be a set-to box, a television, or a set-top box integrated with a television. The device 10, however, may also be an analog/digital recorder, CD/DVD player/recorder, audio equipment, receiver, tuner, and/or any other consumer electronic device. The device 10 may also include any computer, peripheral device, camera, modem, storage device, telephone, personal digital assistant, and/or mobile phone. The communications network 14 may be a cable network operating in the radio-frequency domain and/or the Internet Protocol (IP) domain. The communications network 14, however, may also include a distributed computing network, such as the Internet (sometimes alternatively known as the "World Wide Web"), an intranet, a local-area network (LAN), and/or a wide-area network (WAN). The communications network 14 may include coaxial cables, copper wires, fiber optic lines, and/or hybrid-coaxial lines. The communications network 14 may even include wireless portions utilizing any portion of the electromagnetic spectrum and any signaling standard (such as the I.E.E.E. 802 family of standards).

As FIG. 1 shows, the device 10 receives the content 12 via the communications network 14. The content 12 may have any analog and/or digital format and may be any type of file. The content 12, for example, may be a video file, television programming, streaming data, audio files, pictures, or any other media content. When the device 10 receives the content 12, the content 12 includes a lock 16. According to an exemplary embodiment, the lock 16 is an electronic or software mechanism that prevents a processor 20 within the device 10 from reading a file from memory. The lock 16 secures the content such that when the content 12 is stored in memory 18 of the device 10, the content is unreadable until expiration of the lock 16. That is, prior to expiration the lock 16 prevents the processor 20 from reading the content 12 from the memory 18. In this manner, the content 12 is securely stored and made inaccessible by the lock 16. The lock 16 may even configure file attributes that "hide" the content 12 from memory directory structures. When the lock 16 expires, however, the content 12 is then readable from the memory 18.

Figure 2:
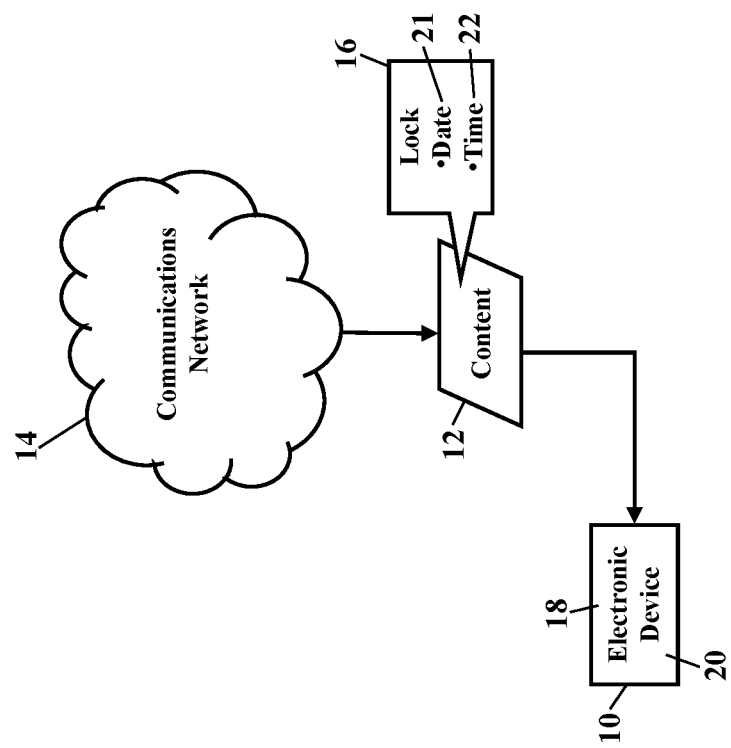
FIG. 2 is a schematic illustrating a lock, according to exemplary embodiments.

FIG. 2 is a schematic further illustrating a lock, according to exemplary embodiments. Here the lock 16 is defined by a date 21 and/or by a time 22. The processor 20 is unreadable to read the content 12 from the memory 18 prior to the date 21 and/or prior to the time 22. At the defined date 21 and time 22, however, the lock 16 expires, thus releasing the lock 16. If, for example, the lock 16 is defined as Jan. 1, 2006 at 8 P.M., then the content 12 will be unreadable prior to that date and time. At the defined date 21 and time 22, however, the lock 16 expires, and the content 12 may then be read from the memory 18.

Figure 3:
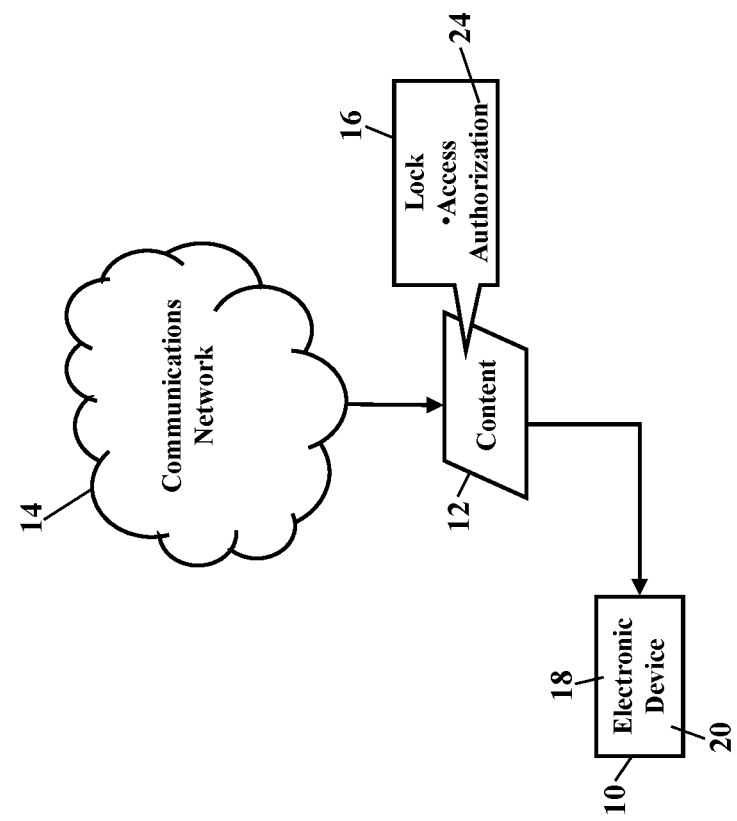
FIG. 3 is a schematic further illustrating the lock, according to more exemplary embodiments.

FIG. 3 is a schematic further illustrating a lock, according to more exemplary embodiments. Here the lock 16 is defined by an access authorization 24. The access authorization 24 prohibits an unauthorized entity from reading the content 12 from the memory 18. If, for example, the access authorization 24 specifies a particular user, then anyone not matching that particular user (via a username, account number, login, or other identifying information) is prohibited from accessing the content 12. If any entity provides information that matches the access authorization 24, then that entity may retrieve the content 12 stored in the memory 18.

Figure 4:
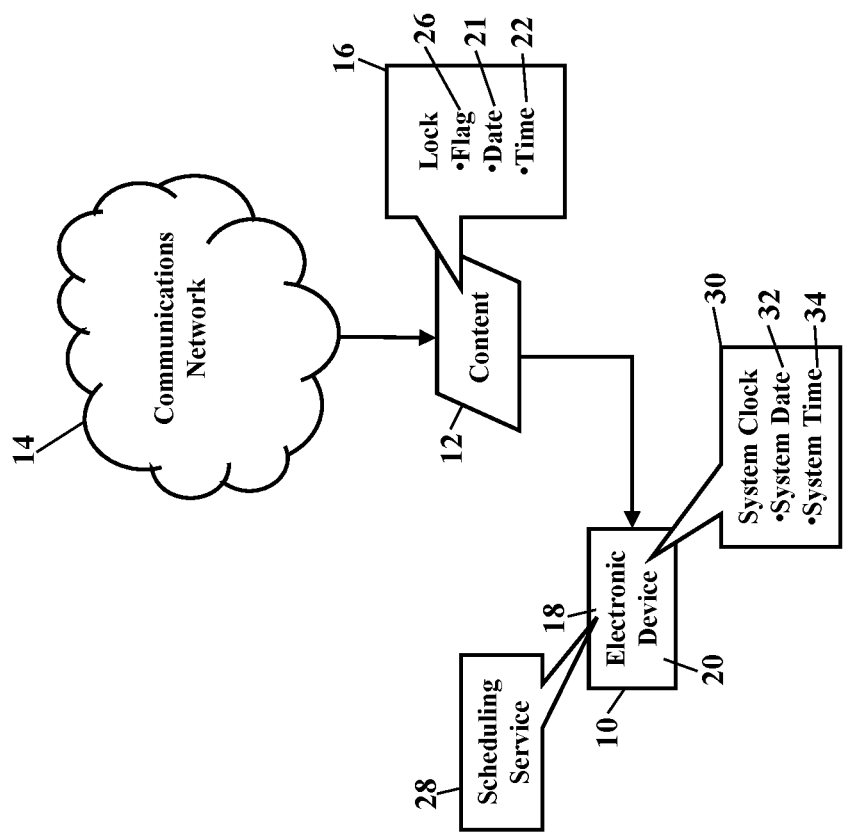
FIG. 4 is a schematic further illustrating the lock, according to still more exemplary embodiments.

FIG. 4 is a schematic further illustrating a lock, according to yet more exemplary embodiments. Here the lock 16 comprises a flag 26. The flag 26 is associated with the content 12, and the flag 26 is again defined by the date 21 and/or by the time 22 at which the content 12 may be read from the memory 18. The flag 26 may also be defined by the access authorization (shown as reference numeral 24 in FIG. 3). The flag 26 may be a file attribute or file property of the content 12.

Here the flag 26 cooperates with a scheduling service 28. The scheduling service 28 is a computer program stored in the memory 18. The scheduling service 28 compares a system clock 30 to the defined date 21 and/or the defined time 22 of the flag 26. The system clock 30 provides a current system date 32 and a current system time 34. If the system date 32 and the system time 34 are prior to the defined date 21 and/or the defined time 22 of the flag 26, then the flag 26 prohibits the content 12 from being read from memory 18. When, however, the system date 32 and the system time 34 equal the defined date 21 and defined time 22 of the flag 26, the lock 16 expires and the content 12 is readable from the memory.

Figure 5:
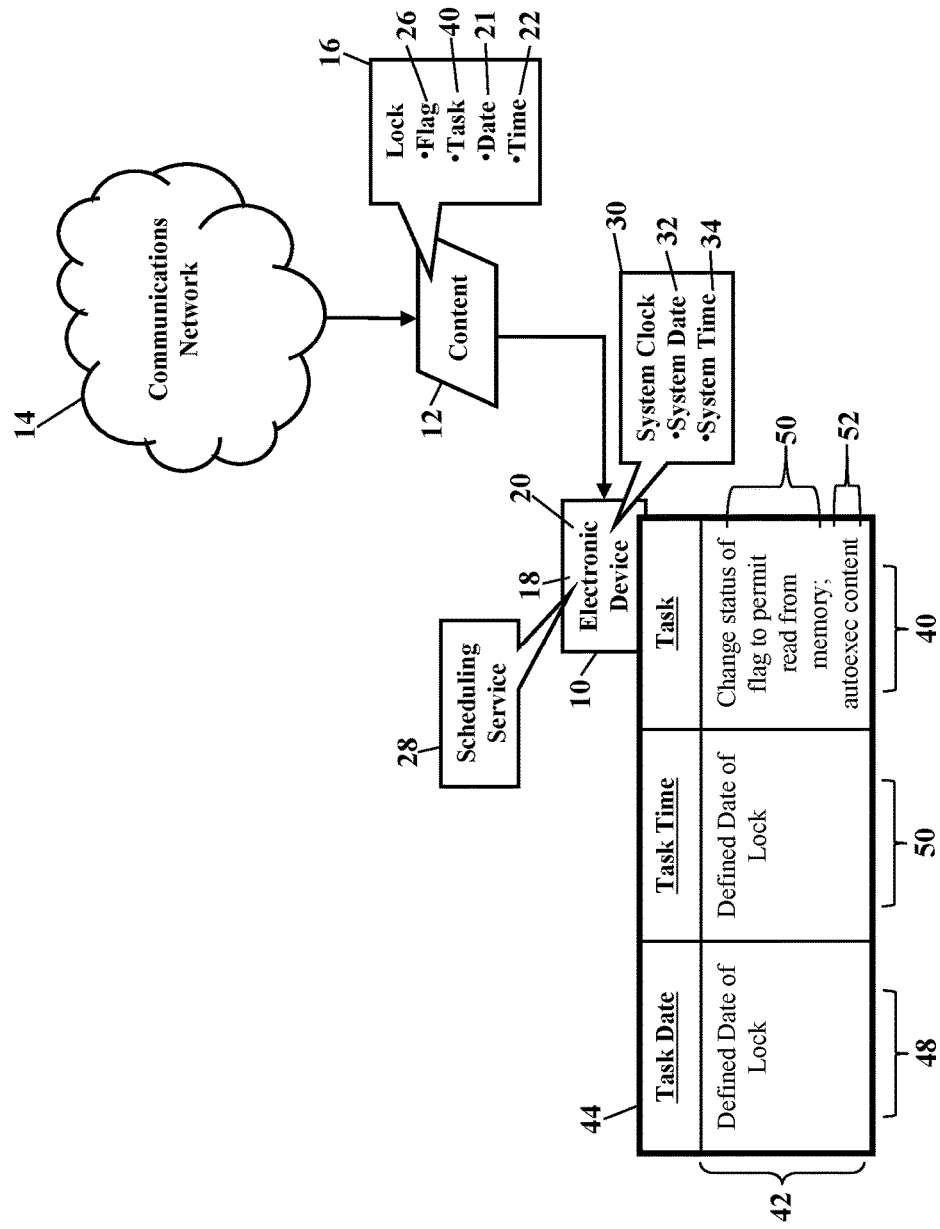
FIG. 5 is a schematic further illustrating the lock, according to yet more exemplary embodiments.

FIG. 5 is a schematic further illustrating a lock, according to yet more exemplary embodiments. Here the lock 16 is defined by the date 21, the time 22, and a task 40. As the device 10 receives and stores the content 12, the lock 16 creates a task entry 42 in a table 44 of tasks. The table 44 of tasks is stored in the memory 18 of the device 10. The scheduling service 28 compares the system date 32 and the system time 34 with each entry in the table 44 of tasks. Each task entry 42 is associated with a task time 48 and a task date 50. When the system date 32 and the system time 34 match the task date 48 and the task time 50 associated with any task entry, then the scheduling service 28 performs the associated task.

In this embodiment, then, the lock 16 is defined by the date 21, the time 22, and the task 40. The lock 16 creates the task entry 42 in the table 44 of tasks. The scheduling service 28 continually compares the system date 32 and the system time 34 with the entries in the table 44 of tasks. When the system date 32 and the system time 34 match the task entry 42, the scheduling service 28 performs the task 40. As FIG. 5 illustrates, here the task 40 changes a status 50 of the flag 26 to allow the content 12 to be read from memory 18. The status 50 changes a file attribute of the content 12 from "unreadable" to "readable," thus permitting the content 12 to be read from the memory 18. The task 40 may even include an execute function 52 that causes the content 12 to automatically launch at the defined date 21 and/or at the defined time 22. So, whatever the content 12 represents (e.g., video, music, or an application program), the content 12 is read from memory 18 and automatically presented, or launched, for the user.

Figure 6:
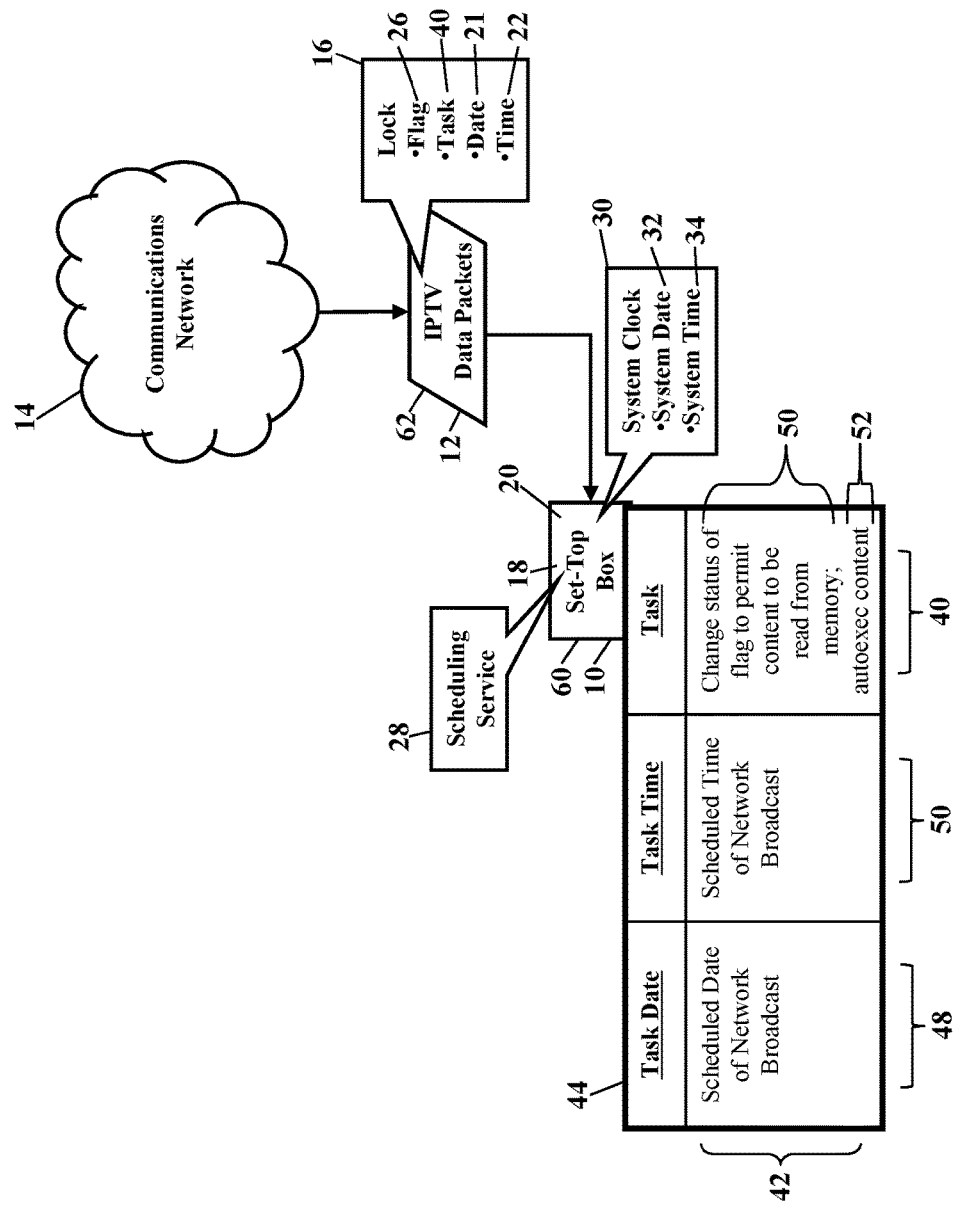
FIGS. 6 and 7 are schematics showing application of the lock to network broadcasting, according to even more exemplary embodiments.

FIG. 6 is a schematic applying a lock to network broadcasting, according to still more exemplary embodiments. Here the device 10 is a set-top box 60 (and perhaps integrated with a television) that receives the content 12 via the communications network 14. Although the content 12 is shown as Internet Protocol television ("IPTV") data packets 62, the content 12, as before, may be any video, audio, or file having any format. The content 12, in fact, may be any packetized information. The content 12 for example, could be any content that serves as a control channel for controlling viewed media, e.g., television programming or other media content. The Internet Protocol television data packets 62 correspond with cable or broadcast television programming, although formatted in a packetizing scheme, as is known to those of ordinary skill in the art. Because the communications network 14 is bandwidth constrained, the content 12 may be communicated to the set-top box 60 during off-peak hours to conserve bandwidth.

The set-top box 60 stores the content 12. The set-top box 60 receives the Internet Protocol television data packets 62 and stores the packets in the memory 18. Because the Internet Protocol television data packets 62 may be received and stored during off-peak hours, the programming could be received hours, or even days, before a scheduled network broadcast. That is, the latest episode of "The Apprentice" might be received hours, or days, before its scheduled primetime showing. Network broadcasters, then, may wish to prevent subscribers, viewers, and users from accessing the content 12 prior to its scheduled timeslot.

The lock 16 prohibits early access. When the Internet Protocol television data packets 62 are received and stored, the downloaded file includes the lock 16. The lock 16, as earlier described, is defined by the date 21, the time 22, and the task 40. The defined date 21 and the defined time 22 correspond to the scheduled broadcast date and time for the program (e.g., the network's scheduled broadcast time for "The Apprentice"). The task 40 is added to the table 44 of tasks, and the scheduling service 28 begins comparing entries. The scheduling service 28 compares the system date 32 and the system time 34 with each task entry in the table 44 of tasks. When the system date 32 and the system time 34 match the scheduled broadcast date and time for the program (again, the network's scheduled broadcast time for "The Apprentice"), the scheduling service 28 performs the task 40 associated with the lock 16. The scheduling service 28, in this embodiment, changes a file attribute from "unreadable" to "readable," thus permitting the Internet Protocol television data packets 62 to be read from the memory 18. The latest episode of "The Apprentice," for example, is now available for viewing. The task 40 may even include automatically reading and launching the latest episode, if so configured and if the set-top box 60 is electrically powered and "on." The subscriber, of course, may defer viewing to a later time, but the lock 16 prohibits the subscriber from "previewing" the episode prior to its schedule network broadcast date and time.

Figure 7:
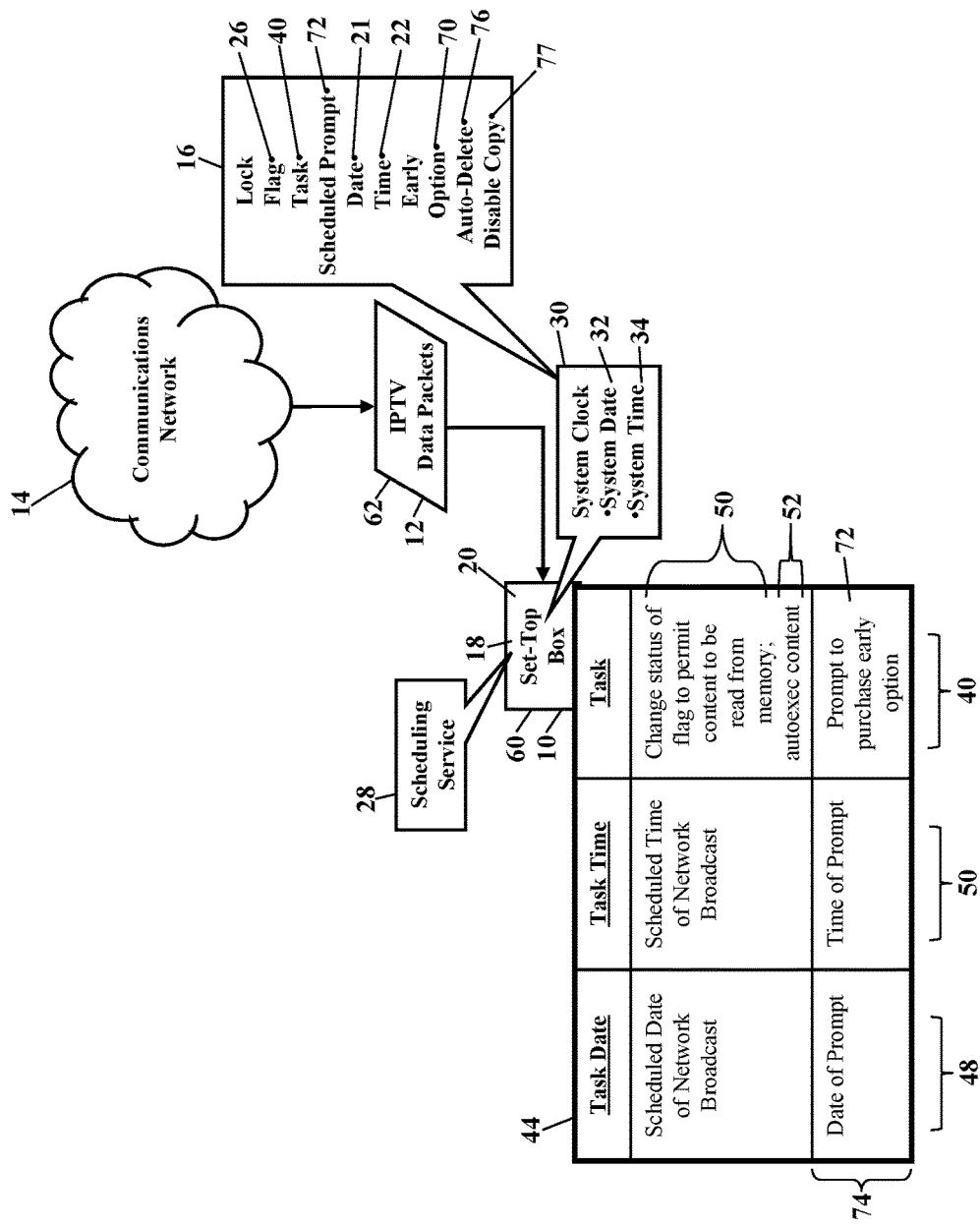

FIG. 7 is a schematic further applying a lock to network broadcasting, according to even more exemplary embodiments. FIG. 7 is similar to FIG. 6, although here the lock 16 includes an "early" viewing/listening/experiencing option 70. The lock 16, as earlier explained, prohibits the subscriber from previewing movies, programs, music, and other content prior to a scheduled date and time. The early viewing option 70, however, allows the subscriber an opportunity to experience the content 12 prior to the scheduled date and time.

The lock 16, as before, is defined by the date 21, the time 22, and the task 40. Here, however, the task 40 includes a scheduled prompt 72. That is, the task 40 includes a nested sub-task 74 that is added to the table 44 of tasks. When the system date 32 and the system time 34 match the date and time associated with the sub-task 74, the scheduling service 28 launches the scheduled prompt 72 routine. The scheduled prompt 72 is visually or audibly presented on the device 10. The scheduled prompt 72 prompts the subscriber to purchase an early viewing/listening option. The scheduled prompt 72 is visually and/or audibly presented to the subscriber some minutes, hours, or days prior to the scheduled date and time for the content 12. The network broadcaster, again using "The Apprentice" as an example, may offer some or all subscribers an opportunity to view the latest episode one (1) hour prior to the scheduled primetime slot. (One hour, of course, is only an example—the scheduled prompt 72 may occur at any time.) If the subscriber wishes to purchase this option, the subscriber enters the proper response that accepts the early viewing option. The sub-task 74 then reconfigures the lock 16 such that the latest episode of the "The Apprentice" is readable one hour prior to the scheduled broadcast. If payment is required for this early viewing option, then the service provider or some other billing entity makes the appropriate notations. Payment information (such as an account number, credit card number, communications address, telephone number, and/or payment amount) is communicated from the device 10 to the service provider via the communications network 14.

The "early" viewing/listening/experiencing option 70 may be configured. The "early" viewing/listening/experiencing option 70, for example, may permit the subscriber to preview all, or only a portion of, a movie, program episode, or other content. The lock 16, as earlier explained, prohibits the subscriber from previewing movies, programs, music, and other content prior to a scheduled date and time. The "early" option 70, however, may permit the subscriber to preview the first five (5) minutes of content without payment. That is, the subscriber may freely unlock only a portion of "The Apprentice" (or some other content). After that portion has been viewed, heard, or experienced, the subscriber is prompted to unlock the remaining content. The scheduled prompt 72 prompts the subscriber to unlock the remaining portion. Payment or other compensation may be required to unlock the remaining portion.

The lock 16 may also have other features. The lock 16 may have an auto-delete feature 76 that automatically deletes the content 12 from memory. The lock 16, for example, may create a task entry in the table 44 of tasks that deletes the content 12 after an amount of time. The content provider may not wish to have the content 12 indefinitely available on the subscriber's device 10. The content provider, then, would configure the lock 16 to include a task that automatically deletes the content 12 after a predetermined time or date.

The lock 16 may also disable copy commands 77. The content provider 12 may not want the subscriber to copy the downloaded content 12 to another device or memory location. The lock 16, then, may also include a task that sets a file attribute as "read-only," thus preventing the content 12 from being copied or moved.

Figure 8:
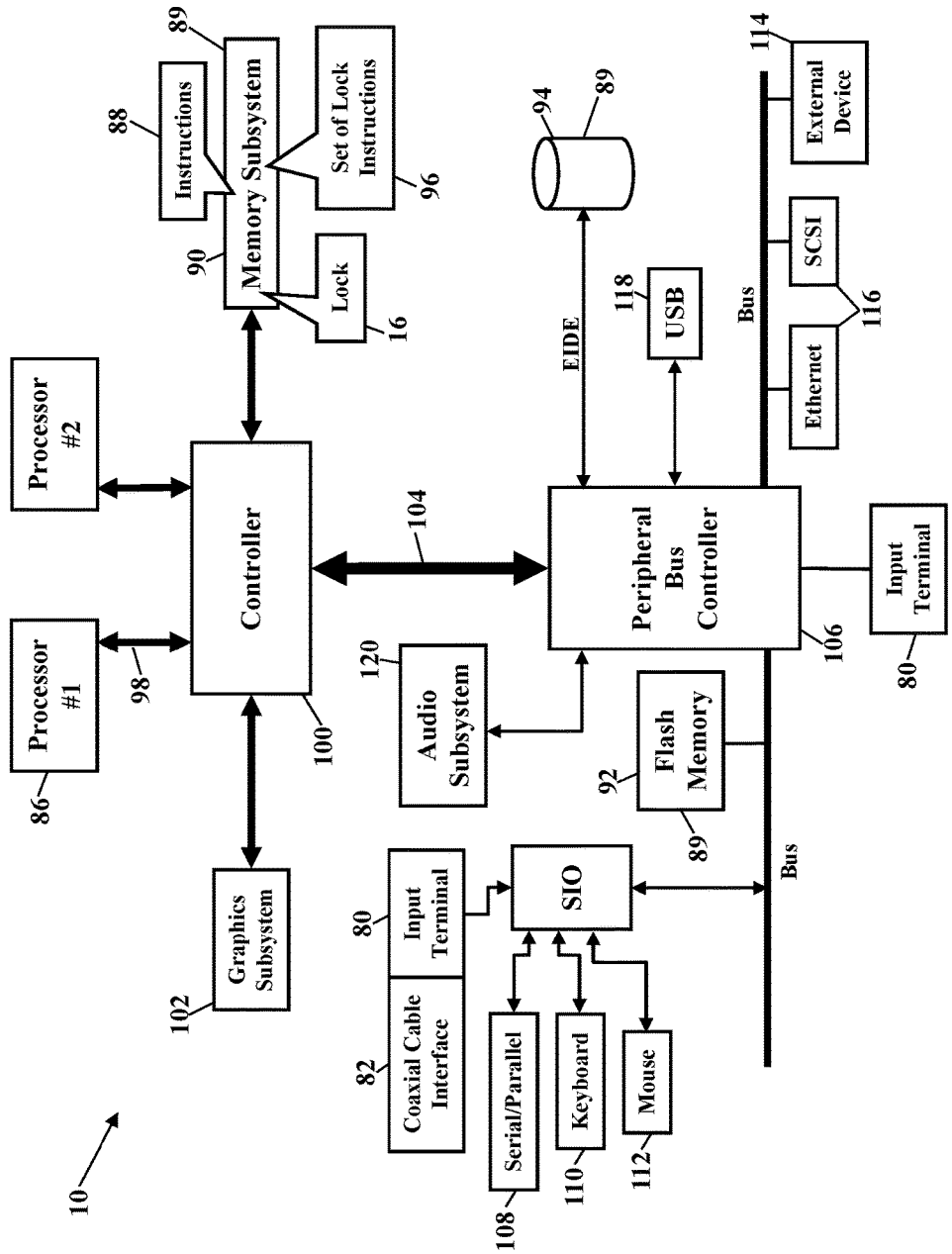
FIG. 8 is a block diagram of exemplary details of a device shown in FIGS. 1-7.

FIG. 8 is a block diagram of exemplary details of the device 10 shown in FIGS. 1-7. The device 10 can be any device, such as an analog/digital recorder, television, CD/DVD player/recorder, audio equipment, receiver, tuner, and/or any other consumer electronic device. The device 10 may also include any computer, peripheral device, camera, modem, storage device, telephone, personal digital assistant, and/or mobile phone. The device 10 may also be configured as a set-top box ("STB") receiver that receives and decodes digital signals. The device 10, in fact, can be any processor-controlled electronic/electrical device that has an input 80 for receiving the requested content (shown as reference numeral 12 in FIGS. 1-7). The input 80 may include a coaxial cable interface 82 for receiving signals via a coaxial cable (not shown). The input 80 may additionally or alternatively include an interface to a fiber optic line, to a telephone line (such as an RJ-48/56), to other wiring, and to any male/female coupling. The device 10 includes one or more processors 86 executing instructions 88 stored in a system memory device 89. The instructions 88, for example, are shown residing in a memory subsystem 90. The instructions 88, however, could also reside in flash memory 92 or a peripheral storage device 94. When the processor 86 executes the instructions 88, the processor 86 may also establish the lock 16. The processor 86 may establish the lock 16 by executing a set 96 of lock instructions stored in the system memory device. The one or more processors 86 may also execute an operating system that controls the internal functions of the device 10. A bus 98 may communicate signals, such as data signals, control signals, and address signals, between the processor 86 and a controller 100. The controller 100 provides a bridging function between the one or more processors 86, any graphics subsystem 102 (if desired), the memory subsystem 90, and, if needed, a peripheral bus 104. The peripheral bus 104 may be controlled by the controller 100, or the peripheral bus 104 may have a separate peripheral bus controller 106. The peripheral bus controller 106 serves as an input/output hub for various ports. These ports include the input terminal 80 and perhaps at least one output terminal. The ports may also include a serial and/or parallel port 108, a keyboard port 110, and a mouse port 112. The ports may also include one or more external device ports 114, networking ports 116 (such as SCSI or Ethernet), and a USB port 118. The device 10 may also include an audio subsystem 120. The device 10 may also include a display device (such as LED, LCD, plasma, or any other) to present instructions, messages, tutorials, and other information to a user. The device 10 may further include one or more encoders, one or more decoders, input/output control, logic, one or more receivers/transmitters/transceivers, one or more clock generators, one or more Ethernet/LAN interfaces, one or more analog-to-digital converters, one or more digital-to-analog converters, one or more "Firewire" interfaces, one or more modem interfaces, and/or one or more PCMCIA interfaces. Those of ordinary skill in the art understand that the program, processes, methods, and systems described herein are not limited to any particular architecture or hardware.

The processors 86 may be implemented with a digital signal processor (DSP) and/or a microprocessor. ADVANCED MICRO DEVICES®, for example, manufactures a full line of microprocessors (Advanced Micro Devices, Inc., One AMD Place, P.O. Box 3453, Sunnyvale, Calif. 94088-3453, 408.732.2400, 800.538.8450). INTEL® also manufactures a family of microprocessors (Intel Corporation, 2200 Mission College Blvd., Santa Clara, Calif. 95052-8119, 408.765.8080). Other manufacturers also offer microprocessors. Such other manufacturers include MOTOROLA® (1303 East Algonquin Road, P.O. Box A3309 Schaumburg, Ill. 60196), IBM® (New Orchard Road, Armonk, N.Y. 10504, (914) 499-1900), and TRANSMETA® (3940 Freedom Circle, Santa Clara, Calif. 95054). TEXAS INSTRUMENTS® offers a wide variety of digital signal processors (Texas Instruments, Incorporated, P.O. Box 660199, Dallas, Tex. 75266-0199, Phone: 972-995-2011) well as MOTOROLA®. There are, in fact, many manufacturers and designers of digital signal processors, microprocessors, controllers, and other componentry that are described in this patent. Those of ordinary skill in the art understand that this componentry may be implemented using any suitable design, architecture, and manufacture. Those of ordinary skill in the art, then, understand that the exemplary embodiments are not limited to any particular manufacturer's component, or architecture, or manufacture.

The memory (shown as memory subsystem 90, flash memory 92, or peripheral storage device 94) may also contain an application program. The application program cooperates with the operating system and with a video display device to provide a Graphical User Interface (GUI). The graphical user interface provides a convenient visual and/or audible interface with a user of the device 10.

Figure 9:
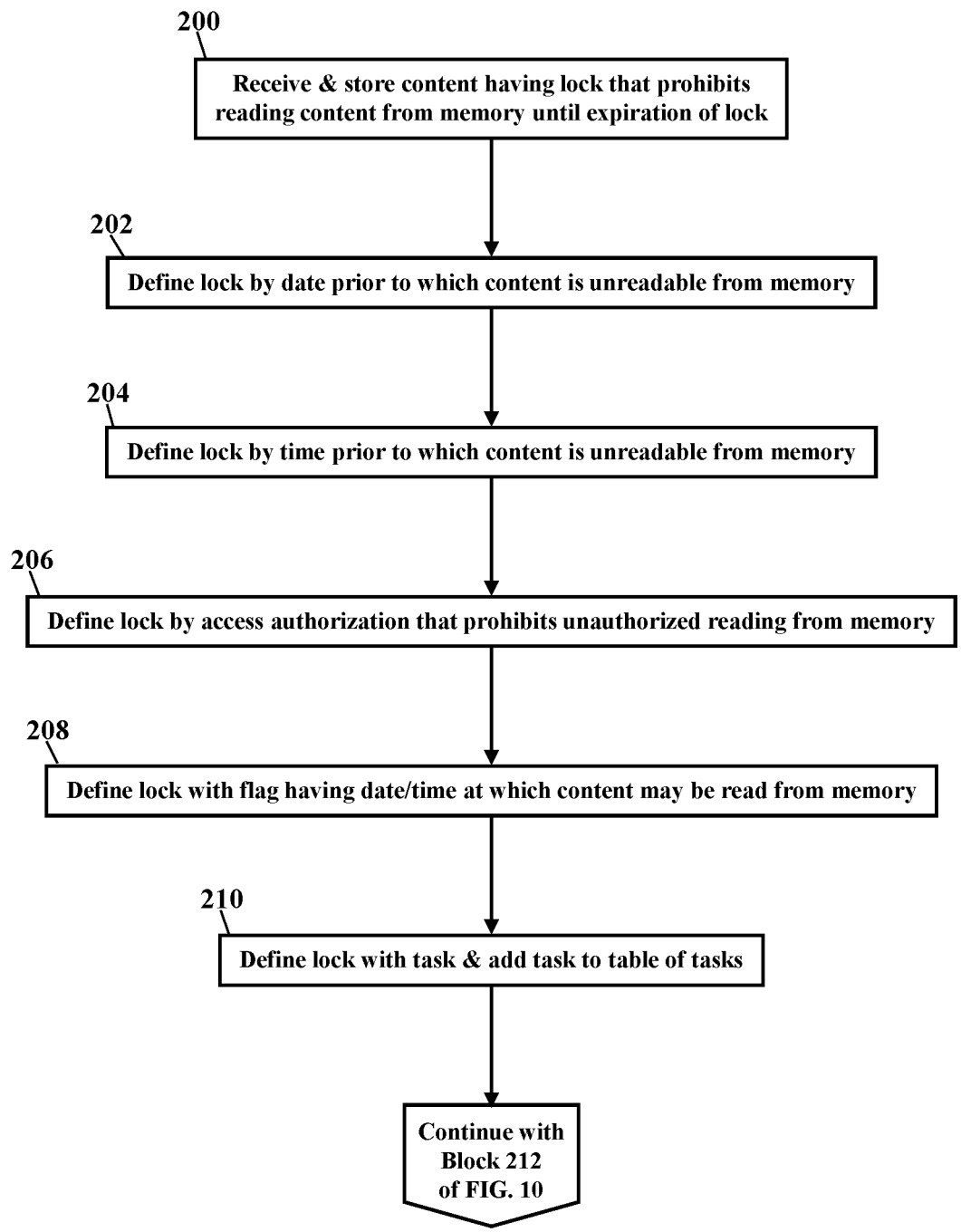
FIGS. 9 and 10 are flowcharts illustrating a method of securing content, according to exemplary embodiments.
Figure 10:
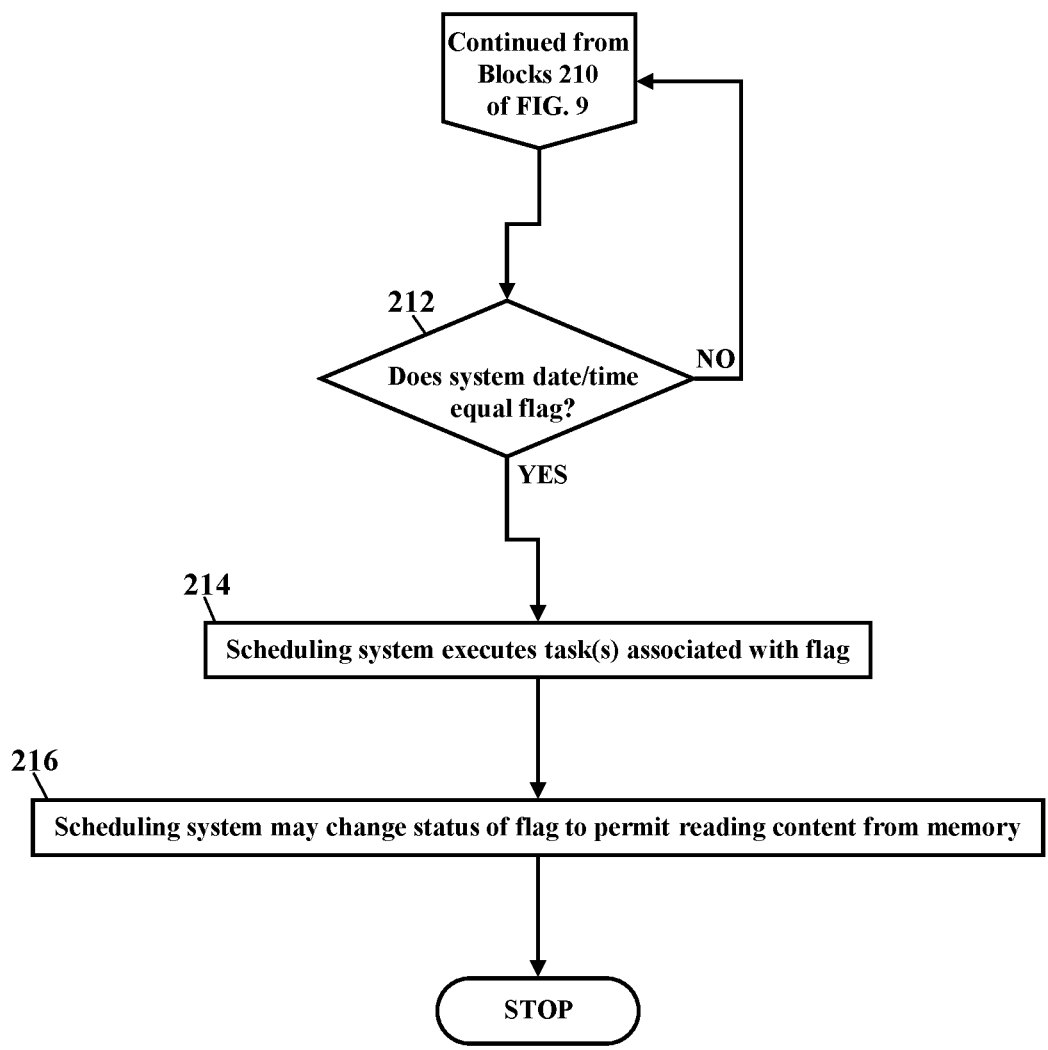

FIGS. 9 and 10 are flowcharts illustrating a method of securing content. The content is received, and the content has a lock that prohibits reading the content from memory until expiration of the lock (Block 200). The lock may be defined by a date prior to which the content is unreadable from the memory (Block 202). The lock may additionally or alternatively be defined by a time prior to which the content is unreadable from the memory (Block 204). The lock may additionally or alternatively be defined by an access authorization that prohibits unauthorized reading the content from the memory (Block 206). The lock may comprise a flag defined by a date and a time at which the content may be read from the memory, and prior to the flag the content is unreadable (Block 208). The lock may define a task, and the task is added to a table of tasks (Block 210).

The flowchart continues with FIG. 10. A system date and a system time are compared to the flag (Block 212). If the system date and the system time equal the flag, then a scheduling system executes any tasks associated with the flag (Block 214). The scheduling system may change a status of the flag to permit reading the content from the memory (Block 216).

The lock 16 may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000). This computer-readable medium, or media, could be distributed to end-users, licensees, and assignees. These types of computer-readable media, and other types not mention here but considered within the scope of the embodiments, allow the lock 16 to be easily disseminated. A computer program product for securing content files includes computer-readable instructions stored on the computer-readable medium. Content is received, and the content has a lock that prohibits reading the content from memory until expiration of the lock. The content is stored in the memory, thereby securing the content until expiration of the lock.

The lock may also be physically embodied on or in any addressable (e.g., HTTP, I.E.E.E. 802.11, Wireless Application Protocol (WAP)) wire line or wireless device capable of presenting an IP address. Examples could include a computer, a wireless personal digital assistant (PDA), an Internet Protocol mobile phone, or a wireless pager.

While exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
   receiving, by a server, a selection sent from a device, the selection requesting a preview of a content;
   determining, by the server, that the content is restricted from an access by a lock until an expiration of the lock at a date and time;
   accessing, by the server, the content prior to the expiration of the lock at the date and time to generate the preview; and
   streaming, by the server, the preview to the device prior to the expiration of the lock at the date and time.

2. The method of claim 1, further comprising processing a payment associated with the preview of the content.

3. The method of claim 1, further comprising generating a prompt associated with the preview.

4. The method of claim 1, further comprising displaying a prompt associated with the preview.

5. The method of claim 1, further comprising generating a prompt, prior to the expiration of the lock at the date and time, for the preview of the content.

6. The method of claim 1, further comprising scheduling a prompt associated with the preview.

7. The method of claim 1, further comprising releasing the content for the access at the expiration of the lock at the date and time.

8. A system, comprising:
   a hardware processor; and
   a memory device, the memory device storing code, the code when executed causing the hardware processor to perform operations, the operations comprising:
   receiving a selection associated with a device, the selection requesting a preview of a content;
   determining the content is restricted from an access by a lock until an expiration of the lock at a date and time;
   accessing the content prior to the expiration of the lock at the date and time to generate the preview; and
   streaming the preview to the device prior to the expiration of the lock at the date and time.

9. The system of claim 8, wherein the operations further comprise processing a payment associated with the preview of the content.

10. The system of claim 8, wherein the operations further comprise generating a prompt associated with the preview.

11. The system of claim 8, wherein the operations further comprise displaying a prompt associated with the preview.

12. The system of claim 8, wherein the operations further comprise generating a prompt, prior to the expiration of the lock at the date and time, for the preview of the content.

13. The system of claim 8, wherein the operations further comprise scheduling a prompt associated with the preview.

14. The system of claim 8, wherein the operations further comprise releasing the content for the access at the expiration of the lock at the date and time.

15. The system of claim 8, wherein the operations further comprise releasing the content from the memory device at the expiration of the lock at the date and time.

16. The system of claim 8, wherein the operations further comprise identifying a credit card number associated with the preview of the content.

17. A memory device storing instructions which when executed cause a hardware processor to perform operations, the operations comprising:
   receiving a selection associated with a device, the selection requesting a preview of a content;
   determining the content is restricted from an access by a lock until an expiration of the lock at a date and time;
   accessing the content prior to the expiration of the lock at the date and time to generate the preview; and
   streaming the preview to the device prior to the expiration of the lock at the date and time.

18. The memory device of claim 17, wherein the operations further comprise processing a payment associated with the preview of the content.

19. The memory device of claim 17, wherein the operations further comprise generating a prompt associated with the preview.

20. The memory device of claim 17, wherein the operations further comprise displaying a prompt associated with the preview.

* * * * *